United States Patent Office 3,646,151
Patented Feb. 29, 1972

3,646,151
TRICYCLIC COMPOUNDS AND PROCESS
Jacques Prost Marechal, Paris, and Georges Tomasik, Rosny-sous-Bois, France, assignors to Roussel-UCLAF, Paris, France
No Drawing. Filed Jan. 23, 1969, Ser. No. 793,554
Claims priority, application France, Jan. 26, 1968, 137,630
Int. Cl. C07c 49/44
U.S. Cl. 260—586       10 Claims

ABSTRACT OF THE DISCLOSURE

13β-R-4,5-seco-Δ⁹-gonene-3,5-diones of the formula

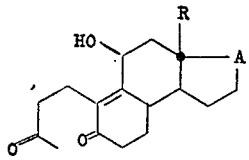

wherein R represents an alkyl having 1 to 4 carbon atoms and A represents a member selected from the group consisting of

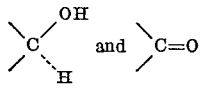

as well as a process for their preparation. The novel compounds are useful as intermediates in the production of known steroids having useful physiological properties.

OBJECTS OF THE INVENTION

An object of the invention is the obtention of novel hydroxylated tricyclic compounds useful as intermediates in the production of known steroids.

Another object of the present invention is the obtention of 13β-R-4,5-seco-Δ⁹-gonene-3,5-diones of the formula

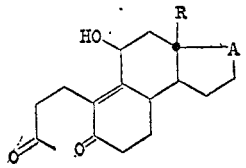

wherein R represents an alkyl having 1 to 4 carbon atoms and A represents a member selected from the group consisting of

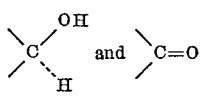

A further object of the present invention is the development of a process for the obtention of 13β-R-4,5-seco-Δ⁹-gonene-3,5-diones of the formula

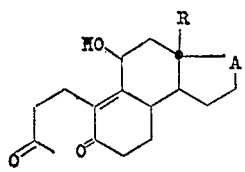

wherein R represents an alkyl having 1 to 4 carbon atoms and A represents a member selected from the group consisting of

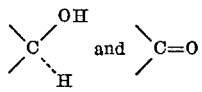

which comprises the steps of (a) causing the double bond to migrate from the 9,10 position to the 9,11 position of a 3-ketal of a 13β-R-4,5-seco-Δ⁹-gonene-3,5-dione of the formula

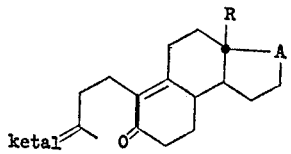

wherein R represents an alkyl having 1 to 4 carbon atoms and A represents a member selected from the group consisting of

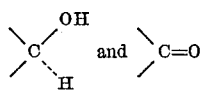

by the action of a basic isomerization agent, followed by the action of an acid, (b) oxidizing the resultant 3-ketal of a 13β-R-4,5-seco-Δ⁹⁽¹¹⁾-gonene-3,5-dione of the formula

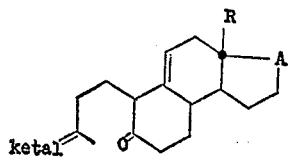

wherein R and A have the above-assigned meanings, by the action of a gas containing oxygen, in a basic medium, (c) subjecting the resultant 3-ketal of an 11β-hydroperoxy-13β-R-4,5-seco-Δ⁹-gonene-3,5-dione of the formula

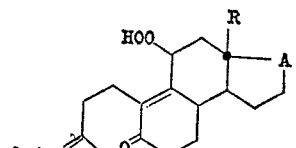

wherein R and A have the above-assigned meanings, to the action of reducing agent, (d) hydrolyzing the resultant 3-ketal of an 11β-hydroxy-13β-R-4,5-seco-Δ⁹-gonene-3,5-dione of the formula

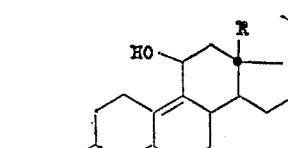

wherein R and A have the above-assigned meanings, by the action of a hydrolyzing acid, and (e) recovering said 13β-R-4,5-seco-Δ⁹-gonene-3,5-diones.

These and other objects of the invention will become more apparent as the description thereof proceeds.

DESCRIPTION OF THE INVENTION

The invention relates to 13β-R-4,5-seco-Δ⁹-gonene-3,5-diones of the Formula I

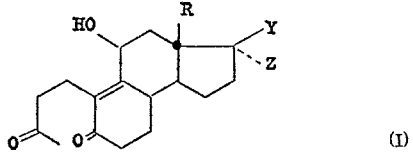

(I)

wherein, here and in the following, R represents an alkyl having 1 to 4 carbon atoms, either branched or straight chain, Y represents a hydroxyl and Z represents a hydrogen or Z and Y together represent a ketonic oxygen.

The compounds of the general Formula I are useful as intermediates for the synthesis of steroids and steroidal derivatives. Their use in steroid synthesis allows the obtention in an advantageous fashion of numerous known steroids and steroidal derivatives having useful physiological properties by an unobvious new method of synthesis.

The new compounds of the general Formula I are thus useful as intermediates in the synthesis of diverse steroidal compounds such as the 13β-R-Δ⁴-gonene-11β,17β-diol-3-ones, the 13β-R-Δ⁴,⁹-gonadiene-11β,17β-diol-3-ones, the 13β - R - Δ⁴,⁹-gonadiene-11β-ol-3,17-diones, the 13β-R-Δ⁴,⁹,¹¹-gonatriene-17β-ol-3-ones and other steroidal derivatives of known interest.

The process for the preparation of the compounds of the general Formula I is illustrated by the following flow diagram of Table I.

TABLE I

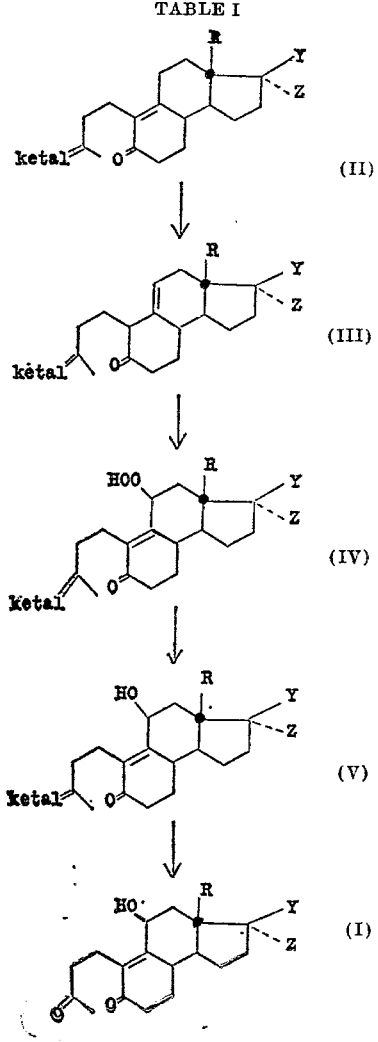

This process is characterized essentially in the following steps.

(1) The double bond in the 9,10 position of a 3-ketal of a

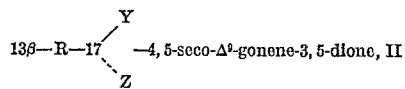

is caused to migrate into the 9,11 position by the action of a basic isomerization agent, followed by the action of an acid agent.

(2) The resultant 3-ketal of a

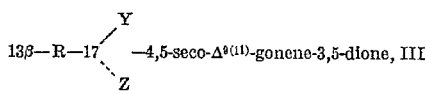

is oxidized in a basic medium by the action of a gas containing oxygen.

(3) The resultant 3-ketal of an

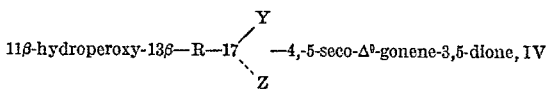

is reduced by the action of a reducing agent.

(4) The 3-ketal of an

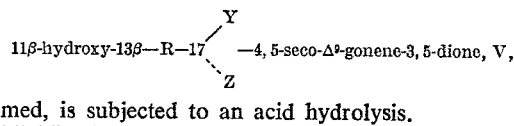

formed, is subjected to an acid hydrolysis.

(5) The desired corresponding

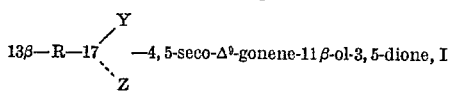

is recovered.

The process of the invention can be further characterized by the methods of execution indicated below.

The basic isomerization agent utilized in step 1 to act on the 3-ketal of a

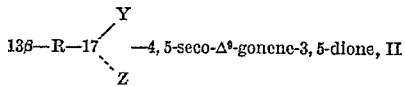

is a strong base such as an alkali metal tertiary-lower-alkanolate, an alkali metal amide or an alkali metal acetylide, preferably a potassium tert.-amylate or tert.-butylate. The isomerization in a basic medium of the 3-ketal of a

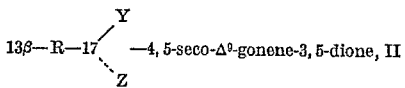

is effected conveniently in the presence of an organic solvent such as dimethylsulfoxide, dimethylformamide or the dimethyl ether of diethyleneglycol, at about room temperatures. The isomerization step is followed by the action of an acid agent, preferably an organic acid such as a lower alkanoic acid, for example, acetic acid, or boric acid. The acid agent is utilized in an aqueous solution, and the reaction medium is preferably kept weakly alkaline.

The basic medium in which the 3-ketal of a

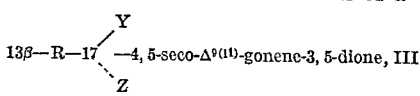

is oxidized, is selected particularly from the group consisting of the aliphatic tertiary amines, preferably the tri-lower alkylamines such as triethylamine; the cyclic tertiary amines such as pyridine and its homologs; and the organic derivatives of quaternary ammonium such as the benzyl-tri-loweralkyl ammonium halides, for example, benzyltrimethyl ammonium chloride. The oxidation of the 3-ketal of a

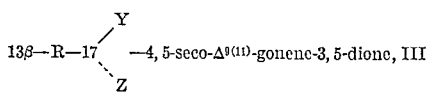

by a gas containing oxygen is effected conveniently in the presence of a lower alkanol such as ethanol or methanol or in the presence of an N,N-di-lower-alkyl lower-alkanoylamide such as dimethylformamide, or in a mixture of these, at about room temperature.

In order to effect the reduction of the 3-ketal of an

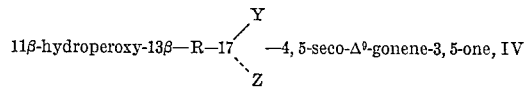

preferably a phosphite is chosen as the reducing agent, such as a tri-lower-alkyl phosphite, for example, trimethylphosphite or triethylphosphite. An alkali metal iodide such as potassium iodide, in the presence of a lower alkanoic acid, such as acetic acid, can also be utilized, or also other reducing agents can be utilized. The reduction reaction is preferably conducted in the presence of the solvent utilized in the preceding oxidation step at temperatures up to the reflux temperature. Preferably the excess of the reducing agent is destroyed by an oxidizing agent such as hydrogen peroxide before the resultant compound is recovered.

The acid utilized in the acid hydrolysis step in order to obtain the hydrolysis of the 3-ketal of an

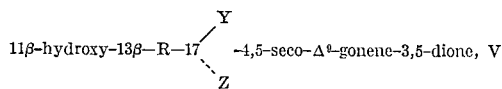

is an organic carboxylic acid such as a lower alkanoic acid, for example, acetic acid or a hydroxy-lower-alkanoic acid, for example, citric acid. The acid hydrolysis step is conveniently effected in the presence of one or several organic solvents such as a lower alkanol, for example, methanol or ethanol, or an aromatic hydrocarbon solvent such as benzene or toluene. Small amounts of water are conveniently utilized and the hydrolysis is conducted at elevated temperatures up to the reflux temperature.

As starting materials, the 3-ketal of a

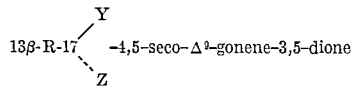

is preferably a 3-lower alkylenedioxy ketal such as 3,3-ethylenedioxy. The 3,3-ethylenedioxy-13β-R-4,5-seco-Δ⁹-gonene-17β-ol-5-ones $$\left( \text{II, with ketal} = \begin{matrix} CH_2-O \\ | \\ CH_2-O \end{matrix} \hspace{-2pt}\rangle, \ Y=OH, \ Z=H \right)$$

can be obtained according to the process of the U.S. Patent 3,413,314. The 3,3-ethylenedioxy-13β-R-4,5-seco-Δ⁹-gonene-5,17-diones $$\left( \text{II, with ketal} = \begin{matrix} CH_2-O \\ | \\ CH_2-O \end{matrix} \hspace{-2pt}\rangle, \ Y + Z=O \right)$$

are obtained particularly by the action of an oxidizing agent on the corresponding 3,3-ethylenedioxy-13β-R-4,5-seco-Δ⁹-gonene-17β-ol-5-ones.

As has been mentioned above, the new compounds of the general Formula I are useful as intermediates in the synthesis of diverse monoenic, dienic or trienic steroid derivatives and other steroids of known interest.

Several of such applications are given below as well as in the examples.

(A) A process for the preparation of 13β-R-Δ⁴-gonene-11β,17β-diol-3-ones was realized as follows:

13β-R-4,5-seco-Δ⁹-gonene-11β,17β-diol-3,5-dione is subjected to a catalytic hydrogenation, then the resultant 13β-R-4,5-seco-gonane-11β,17β-diol-3,5-dione is cyclized by the action of an acidic or basic cyclization agent. The corresponding 13β-R-Δ⁴-gonene-11β,17β-diol-3-one is obtained. The catalytic hydrogenation is conveniently effected with the aid of palladium hydroxide.

This catalytic hydrogenation supplies, in addition to 13β - R - 4,5-seco-(9α,10β)-gonane-11β,17β-diol-3,5-dione, another isomer, the 13β - R - 4,5-seco-(9β,10α)-gonane-11β,17β-diol-3,5-dione. The two isomers are separated due to their differences of solubility in a solvent or a mixture of solvents conveniently chosen, or by chromatography.

The basic agent utilized in order to effect the cyclization of the 13β-R-4,5-seco-gonane-11β,17β-diol-3,5-dione is, for example, an alkali metal hydroxide such as sodium or potassium hydroxide while operating in the presence of a lower alkanol such as methanol. The acidic agent utilized, if desired, in order to effect the same cyclization is, for example, hydrochloric acid, while operating in an acetic acid media.

(B) A process for the preparation of the 13β-R-Δ⁴,⁹-gonadiene-11β,17β-diol-3-ones and the 13β-R-Δ¹,³,⁵⁽¹⁰⁾-gonatriene-3,11β,17β-triols was realized as follows:

13β-R-4,5-seco-Δ⁹-gonene-11β,17β-diol-3,5-dione is cyclized by the action of a basic isomerization agent. The resultant 13β-R-Δ⁴,⁹-gonadiene-11β,17β-diol-3-one, is isomerized, if desired, by heating in the presence of a catalyst to obtain the corresponding 13β-R-Δ¹,³,⁵,⁽¹⁰⁾-gonatriene-3,11β,17β-triol.

The basic agent utilized in order to effect the cyclization of the 13β-R-4,5-seco-Δ⁹-gonene-11β,17β-diol-3,5-dione is, for example, an alkali metal hydroxide, such as sodium or potassium, while operating in a lower alkanol such as methanol.

The isomerization catalyst utilized in order to effect isomerization of the 13β-R-Δ⁴,⁹-gonadiene-11β,17β-diol-3-one is particularly palladium hydroxide. This isomerization is conveniently effected by heating in a lower alkanol in the presence of a weak base such as magnesia.

(C) A process for the preparation of the

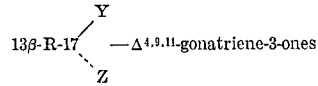

was realized as follows:
An

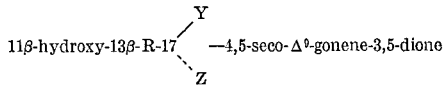

is cyclized in a basic media. The resultant

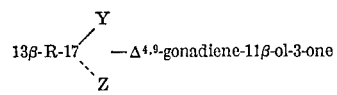

is dehydrated by the action of an acidic agent. The corresponding

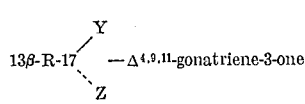

is obtained.

The basic agent utilized in order to effect the cyclization of the

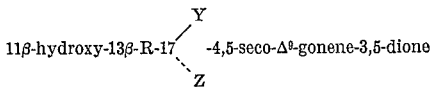

is, for example, an alkali metal hydroxide, such as sodium or potassium hydroxide, while operating in a lower alkanol, such as methanol.

The acidic agent utilized in order to effect the dehydration of the resultant

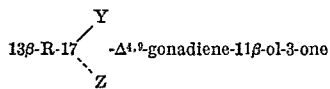
13β-R-17 Y/Z -Δ⁴,⁹-gonadiene-11β-ol-3-one is a strong acid, preferably a strong mineral acid such as perchloric acid, in solution in an organic solvent or mixture of organic solvents, such as methylene chloride and acetonitrile. The dehydrating agent can also be concentrated sulfuric acid and then, this dehydration is effected in the presence of an organic solvent, such as methylene chloride or ether, in a short time of the order of 3 to 15 minutes and at a temperature between +10° C. and −10° C.

The following examples are illustrative of the practice of the invention without, however, being deemed limitative in any manner.

Example 1.—4,5-seco-Δ⁹-estrene-11β,17β-diol-3,5-dione

Step A: 3,3-ethylenedioxy-4,5-seco-Δ⁹⁽¹¹⁾-estrene-17β-ol-5-one.—15 gm. of 3,3-ethylenedioxy-4,5-seco-Δ⁹-estrene-17β-ol-5-one (product obtained by the application of the process of U.S. Pat. No. 3,413,314), then 15 gm. of potassium tert.-butylate were introduced under an inert atmosphere, in the absence of light, into 75 cc. of dimethylsulfoxide. The reaction mixture was agitated at room temperature for a period of 5 hours, then the reaction mixture was poured into a mixture of 600 cc. of a 3% aqueous solution of boric acid and ice. The pH of the reaction media was about 8.5. The precipitate formed was extracted with methylene chloride. The methylene chloride solution was washed with water, dried, and concentrated to dryness. 16.2 gm. of raw 3,3-ethylenedioxy-4,5-seco-Δ⁹⁽¹¹⁾-estrene-17β-ol-5-one was obtained, which was utilized as such for the next step.

As far as is known, this compound is not described in the literature.

Step B: 3,3 - ethylenedioxy - 11β - hydroperoxy - 4,5-seco - Δ⁹ - estrene-17β-ol-5-one.—16.2 gm. of raw 3,3-ethylenedioxy - 4,5-seco-Δ⁹⁽¹¹⁾-estrene-17β-ol-5-one were dissolved in 150 cc. of ethanol containing 1% of triethylamine. The solution was agitated under an atmosphere of oxygen at room temperature during 24 hours. It absorbed about 500 cc. of oxygen. The 3,3-ethylenedioxy-11β-hydroperoxy-4,5-seco-Δ⁹-estrene - 17β-ol-5-one thus obtained was utilized as such in solution for the next stage.

As far as is known, this compound is not described in the literature.

Step C: 3,3 - ethylenedioxy - 4,5 - seco-Δ⁹-estrene-11β,17β-diol-5-one.—6.6 cc. of triethyl phosphite were introduced into the solution of 3,3-ethylenedioxy-11β-hydroperoxy - 4,5-seco-Δ⁹-estrene-17β-ol-5-one obtained in the preceding step (and derived from 15 gm. of 3,3-ethylenedioxy - 4,5-seco-Δ⁹⁽¹¹⁾-estrene-17β-ol-5-one). The reaction mixture was heated to reflux and maintained there for a period of one hour. Then the reaction mixture was poured into a mixture of 30 cc. of a 30% aqueous solution of hydrogen peroxide, of ice and of water. The mixture was agitated; then the aqueous phase was extracted with methylene chloride. The methylene chloride extracts were washed with water and dried. Thereafter, the dried extracts were treated with animal carbon black, agitated, and the carbon black was eliminated by filtration. Then the organic solution was concentrated to dryness. 19 gm. of raw 3,3-ethylenedioxy-4,5-seco-Δ⁹-estrene-11β,17β-diol-5 - one were obtained, which was utilized as such for the next step.

As far as is known, this compound is not described in the literature.

Step D: 4,5-seco-Δ⁹-estrene-11β,17β-diol-3,5-dione.—9.5 cc. of water, 9.5 cc. of citric acid, then 19 gm. of raw 3,3-ethylenedioxy-4,5-seco-Δ⁹-estrene-11β,17β-diol-5-one (derived from 15 gm. of 3,3-ethylenedioxy-4,5-seco-Δ⁹⁽¹¹⁾-estrene-17β-ol-5-one) were introduced into 150 cc. of benzene under an atmosphere of nitrogen. The reaction mixture was heated to reflux and maintained there for a period of one hour. Thereafter, the reaction mixture was cooled and made alkaline by the addition of an aqueus solution of sodium bicarbonate. The organic phase was separated by decantation. The aqueous phase was extracted with methylene chloride. The organic phases were combined, washed with water, and dried. Animal carbon black was added to the dried organic phases, and the mixture was agitated. The carbon black was eliminated by filtration and the solution was concentrated to dryness. The residue was dissolved in methylene chloride. The methylene chloride solution was passed through a column of magnesium silicate, and the solution obtained was concentrated to dryness. The residue was crystallized from ethyl acetate. 4.7 gm. of 4,5-seco-Δ⁹-estrene - 11β,17β-diol-3,5-dione were obtained, having a melting point of 133° C. and a specific rotation $[\alpha]_D^{20} = +66°$ (c.=0.5% in methanol).

On concentration to dryness of the mother liquors from the crystallization step, then by purification by crystallization from isopropyl ether, 1.62 gm. of a second yield was obtained having a melting point of 133° C.

*Analysis.*—$C_{18}H_{26}O_4$: molecular weight=306.39. Calculated (percent): C, 70.56; H, 8.5. Found (percent): C, 70.9; H, 8.5.

Ultraviolet spectra (ethanol): $\lambda_{max.}$ at 246 m$\mu$ ($\epsilon$=12,700)

As far as is known, this compound is not described in the literature.

Example 2.—13β-ethyl-4,5-seco-Δ⁹-gonene-11β,17β-diol-3,5-dione

Step A: 3,3 - ethylenedioxy - 13β - ethyl - 4,5 - seco-Δ⁹⁽¹¹⁾-gonene-17β-ol-5-one.—4 gm. of 3,3-ethylenedioxy-13β - ethyl - 4,5-seco-Δ⁹-gonene-77β-ol-5-one, having a melting point of 95° to 100° C. (product obtained by the application of the process described in U.S. Patent No. 3,413,314), were dissolved in 160 cc. of dimethylsulfoxide under an atmosphere of nitrogen. 32 gm. of potassium tert.-butylate were added to the solution, and the reaction mixture was agitated for a period of 5 hours at room temperature. The reaction solution was then poured into a mixture of ice and 1,200 cc. of a 3% aqueous solution of boric acid. The reaction mixture was agitated, then the aqueous phase was extracted with methylene chloride. The combined methylene chloride extracts were washed with water, dried, and concentrated to dryness under reduced pressure. 4.15 gm. of 3,3-ethylenedioxy-13β - ethyl - 4,5 - seco-Δ⁽⁹¹¹⁾-gonene-17β-ol-5-one were obtained, having a specific rotation $[\alpha]_D^{20}$= 0°±1.5° (c.=0.5% in methanol containing 1% of pyridine). The product was utilized as such for the following step.

Ultraviolet spectra (ethanol): ($\lambda_{max.}$ at 246 m$\mu$ ($\epsilon$=1,497); inflection at 285 m$\mu$ ($\epsilon$=278).

As far as is known, this compound is not described in the literature.

Step B: 3,3 - ethylenedioxy - 11β - hydroperoxy - 13β-ethyl - 4,5-seco-Δ⁹-gonene-17β-ol-5-one.—4 gm. of 3,3-ethylenedioxy - 13β - ethyl - 4,5-seco-Δ⁹⁽¹¹⁾-gonene17β-ol-5-one (derived from 3.85 gm. of 3,3-ethylenedioxy-13β - ethyl - 4,5-seco-Δ⁹-gonene-17β-ol-5-one) were dissolved in 40 cc. of ethanol containing 1% of triethylamine. The solution was then agitated in an atmosphere of oxygen for 15 hours at room temperature. About 230 cc. of oxygen were thus absorbed. The 3,3-ethylenedioxy-11β - hydroperoxy - 13β - ethyl - 4,5 - seco - Δ⁹ - gonene-17β-ol-5-one thus obtained was utilized as such in solution for the next step.

As far as is known, this compound is not described in the literature.

Step C: 3,3-ethylenedioxy - 13β - ethyl - 4,5 - seco-Δ⁹-gonene-11β,17β-diol-5-one.—2.4 cc. of triethyl phosphite were introduced into the solution of 3,3-ethylenedioxy-11β-hydroperoxy - 13β - ethyl - 4,5 - seco-Δ⁹-gonene-17β-ol-5-one (derived from 3.85 gm. of 3,3-ethylenedioxy-13β-ethyl - 4,5 - seco-Δ⁹-gonene-17β-ol-5-one). The reaction mixture was agitated for one hour at room temperature. Thereafter, the mixture was poured into a mixture of a 30% aqueous solution of hydrogen peroxide, and of ice, and agitated. The aqueous phase was extracted with methylene chloride. The combined methylene chloride extracts were washed with water and dried. Animal carbon black was added to the methylene chloride solution, which was agitated. Thereafter, the carbon black was eliminated by filtration, and the solution was concentrated to dryness. The residue obtained was purified by chromatography through silica gel. The elution of the column was effected by a mixture of cyclohexane, 95% ethanol, and ether. After elimination of a mobile fraction which did not contain the desired 11β-hydroxylate derivative, there was separated successively a heterogeneous fraction (A); a fraction (B) of 2.77 gm. of raw 3,3-ethylenedioxy-13β-ethyl-4,5-seco-Δ⁹-gonene - 11β,17β - diol-5-one, having a specific rotation $[α]_D^{20} = +70°$ (c.=0.5% in methanol); then a heterogeneous fraction (C).

Fraction (B) was utilized as such for the following step. The fractions (A) and (C), comprised of 3,3-ethylenedioxy-13β-ethyl-4,5-seco-Δ⁹-gonene - 11β,17β - diol-5-one mixed with impurities, were subjected to citric acid hydrolysis according to the following step and furnished, with lower yields than those for the fraction (B), 13β-ethyl-4,5-seco-Δ⁹-gonene-11β,17β-diol-3,5-dione.

As far as is known, 3,3-ethylenedioxy - 13β - ethyl-4,5-seco-Δ⁹-gonene-11β,17β-diol-5-one is not described in the literature.

Step D: 13β-ethyl - 4,5 - seco-Δ⁹-gonene - 11β,17β-diol-3,5-dione.—1.4 cc. of water, 1.4 gm. of citric acid, and then 2.45 gm. of 3,3-ethylenedioxy-13β-ethyl-4,5-seco-Δ⁹-gonene-11β,17β-diol-5-one, the fraction (B) obtained in the preceding step, were introduced into 20 cc. of benzene in an atmosphere of nitrogen. The reaction mixture was heated to reflux and maintained at reflux for a period of one hour. Thereafter the reaction mixture was cooled, and water was added to it with agitation. The organic phase was separated by decantation. The aqueous phase was extracted with methylene chloride. The organic phases were combined, washed with water, with an aqueous solution of sodium bicarbonate, and then with water. The organic solution was then dried, and animal carbon black was added thereto with agitation. The carbon black was eliminated by filtration, and the organic solution was concentrated to dryness. The residue was crystallized from a mixture of methylene chloride and isopropyl ether. 1.33 gm. of 13β-ethyl-4,5-seco-Δ⁹-gonene - 11β,17β - diol-3,5-dione were obtained, having a melting point of 159° C. and a specific rotation $[α]_D^{20} = +52.5°$ (c.=0.5% in methanol).

By hydrolysis in a citric acid media according to the same operatory method described above, the fractions (A) and (C) obtained in the preceding step gave 0.200 gm. of 13β-ethyl - 4,5 - seco-Δ⁹-gonene - 11β,17β - diol-3,5-dione, having a melting point of 157° C.

Analysis.—$C_{19}H_{28}O_4$; molecular weight=320.41. Calculated (percent): C, 71.22; H, 8.807. Found (percent): C, 71.0; H, 8.6.

Ultraviolet spectra (ethanol): $λ_{max.}$ at 247 mμ (ϵ=12,700).

M.N.R. spectra (deutero chloroform):

signal at about 72 mHz. (multiplet) corresponding to hydrogens of the $CH_3$ group of the ethyl in the 13 position signal at 125 mHz. corresponding to hydrogens of the CO—$CH_3$ group signals at 216.5, 224, and 232 mHz. (triplet) corresponding to the hydrogen in the 17 position.

As far as is known, 13β-ethyl-4,5-seco-Δ⁹-gonene-11β, 17β-diol-3,5-dione is not described in the literature.

Example 3.—4,5-seco-Δ⁹-estrene-11β-ol-3,5,17-trione

Step A: 3,3-ethylenedioxy - 4,5 - seco-Δ⁹-estrene-5,17-dione.—10 gm. of 3,3-ethylenedioxy - 4,5 - seco-Δ⁹-estrene-17β-ol-5-one (product obtained by the application of the process of U.S. Pat. 3,413,314) were introduced into 100 cc. of acetone, and the mixture was agitated at room temperature until dissolution occurred. Thereafter, the reaction mixture was cooled to −10° C. and 7.8 cc. of a 4.6 N solution of a sulfochromic acid mixture was added. The suspension obtained was agitated for one hour at −10° C., then poured into 300 cc. of a saturated solution of sodium bicarbonate and 500 cc. of water. The insoluble material was filtered, and the aqueous phase was extracted with methylene chloride. The organic phase was washed with water, dried, and evaporated to dryness under vacuum. 9.4 gm. of 3,3-ethylenedioxy-4,5-seco-Δ⁹-estrene-5,17-dione were obtained, which was utilized as such for the next step of the synthesis. This product had a specific rotation $[α]_D^{20} = +44.5° ±2°$ (c.=0.5% in methanol).

As far as is known, this compound is not described in the literature.

Step B: 3,3-ethylenedioxy - 4,5 - seco-Δ⁹⁽¹¹⁾-estrene-5,17-dione.—91.5 gm. of 3,3-ethylenedioxy - 4,5 - seco-Δ⁹-estrene-5,17-dione and 90 gm. of potassium tert.-butylate were introduced, under an inert atmosphere, into 460 cc. of dimethylsulfoxide. Next, the reaction mixture was agitated at room temperature for 5 hours, then poured into a mixture of 3.66 liters of water and ice and 3.66 liters of a 3% aqueous solution of boric acid. The precipitate formed was extracted with methylene chloride. The methylene chloride solution was washed with water and dried. 2.35 liters of a solution of 3,3-ethylenedioxy-4,5-seco-Δ⁹⁽¹¹⁾-estrene-5,17-dione in methylene chloride were obtained, which solution was utilized as such for the next step of the synthesis.

Ultraviolet spectra (ethanol):

$$λ_{max.} \text{ at } 246 \text{ mμ } E_{1\ cm.}^{1\%} = 86$$

As far as is known, this compound is not described in the literature.

Step C: 3,3-ethylenedioxy - 11β - hydroperoxy-4,5-seco-Δ⁹-estrene-5,17-dione.—915 cc. of ethanol containing 1% of triethylamine were added to the solution obtained from the preceding step. A stream of oxygen was then passed through the solution under agitation overnight. A solution of 3,3-ethylenedioxy - 11β - hydroperoxy-4,5-seco-Δ⁹-estrene-5,17-dione in methylene chloride was obtained, which was utilized as such for the next step.

As far as is known, this compound is not described in the literature.

Step D: 3,3-ethylenedioxy - 4,5 - seco-Δ⁹-estrene-11β-ol-5,17-dione.—The solution of 3,3-ethylenedioxy-11β-hydroperoxy-4,5-seco-Δ⁹-estrene-5,17-dione obtained in the preceding step was heated under agitation and in an atmosphere of nitrogen, to the point where distillation of methylene chloride commenced. Then 47.5 cc. of triethyl phosphite were introduced into the warm mixture. The heating was continued for a period of one hour. Thereafter, the mixture was cooled to room temperature and poured into a mixture of 2.65 liters of water and ice and 392 cc. of a 30% hydrogen peroxide solution. Agitation of the mixture was maintained for a period of 45 minutes at room temperature. Thereafter, the organic phase was decanted. The aqueous phase was extracted with methylene chloride. The combined methylene chloride extracts were washed with water, dried, and distilled to dryness under vacuum. 96 gm. of 3,3-ethylenedioxy-4,5-seco-Δ⁹-estrene-11β-ol-5,17-dione were obtained which were utilized as such for the following step.

As far as is known, this compound is not described in the literature.

Step E: 4,5-seco-Δ⁹-estrene - 11β - ol-3,5,17-trione.— 96 gm. of 3,3-ethylenedioxy-4,5-seco - Δ⁹ - estrene-11β-ol- 5,17-dione were introduced into 960 cc. of benzene. Then 96 cc. of water and 96 cc. of citric acid were added to the mixture under agitation and under an atmosphere of nitrogen. The reaction mixture was heated to reflux for a period of one hour, cooled, and the aqueous phase was decanted. The aqueous phase was extracted with benzene. The organic phases were combined, and washed with a saturated solution of sodium bicarbonate, and then with water until the wash waters were neutral. The organic solution was dried and filtered under vacuum. The filtration residue was washed with benzene, and the combined filtrates were distilled to dryness under vacuum. 74.5 gm. of 4,5-seco-$\Delta^9$-estrene-11β-ol-3,5,17-trione were obtained.

As far as is known, this compound is not described in the literature.

Example 4.—13β-ethyl-4,5-seco-$\Delta^9$-gonene-11β-ol-3,5,17-trione

Step A: 3,3-ethylenedioxy - 13β - ethyl-4,5-seco-$\Delta^9$-gonene - 5,17 - dione.—5 gm. of 3,3-ethylenedioxy-13β-ethyl-4,5-seco-$\Delta^9$-gonene-17β-ol-5-one (a product obtained by the application of the process of U.S. Pat. No. 3,413,-314) were introduced under an atmosphere of nitrogen into 50 cc. of acetone. The mixture was cooled to −10° C. and, over a period of about 10 minutes, 39 cc. of a 4.6 N solution of a sulfochromic acid mixture was added thereto. The reaction mixture was agitated for one hour at +10° C., then poured into a mixture of 150 cc. of a 10% aqueous sodium bicarbonate solution and 250 cc. of iced water. The insoluble material was filtered. The aqueous phase was extracted with methylene chloride. The organic phases were combined, washed with water, dried, and evaporated to dryness. 4.6 gm. of 3,3-ethylenedioxy-13β - ethyl-4,5-seco-$\Delta^9$-gonene-5,17-dione were obtained, which were utilized as such for the next step.

Ultraviolet spectra (ethanol):

$\lambda_{max.}$ at 249 m$\mu$ E$_{1cm.}^{1\%}$ = 397 or $\epsilon$ = 13,570

As far as is known, this compound is not described in the literature.

Step B: 3,3-ethylenedioxy - 13β - ethyl-4,5-seco-$\Delta^{9(11)}$-gonene-5,17-dione.—29.5 gm. of 3,3-ethylenedioxy-13β-ethyl-4,5-seco-$\Delta^9$-gonene-5,17-dione, then 27 gm. of potassium tert.-butylate were introduced under an inert atmosphere into 270 cc. of dimethylsulfoxide. The mixture was agitated at room temperature for 5 hours and then poured into a mixture of 1,080 cc. of water and ice and 1,080 cc. of a 3% boric acid solution. The mixture was agitated for 15 minutes and extracted with methylene chloride. The organic phase was washed with water and dried. 2.3 liters of a solution of 3,3-ethylene-dioxy-13β-ethyl-4,5-seco-$\Delta^{9(11)}$-gonene-5,17-dione in methylene chloride were obtained, which solution was utilized as such for the following step.

As far as is known, this compound is not described in the literature.

Step C: 3,3 - ethylenedioxy-11β-hydroperoxy-13β-ethyl-4,5-seco - $\Delta^9$-gonene-5,17-dione.—270 cc. of ethanol containing 1% of triethylamine were added to the solution obtained in the preceding step. Then a stream of oxygen was passed through the reaction mixture under agitation overnight. A solution of 3,3-ethylenedioxy-11β-hydroperoxy-13β-ethyl-4,5-seco-$\Delta^9$-gonene-5,17-dione was obtained, which was utilized as such for the following step.

As far as is known, this compound is not described in the literature.

Step D: 3,3 - ethylenedioxy - 13β - ethyl-4,5-seco-$\Delta^9$-gonene-11β-ol-5,17-dione.—The solution of 3,3-ethylenedioxy-11β - hydroperoxy-13β - ethyl - 4,5-seco-$\Delta^9$-gonene-5,17-dione was heated under agitation and under an atmosphere of nitrogen, until distillation commenced. Then 9 cc. of triethyl phosphite were added thereto. The methylene chloride was distilled. Then the reaction mixture was heated to reflux for a period of one hour under agitation. The mixture was cooled to room temperature, then poured into a mixture of 1.5 liters of water and ice and 50 cc. of a 30% hydrogen peroxide solution. The mixture was agitated for 15 minutes. Then the aqueous phase was extracted with methylene chloride. The organic phases were washed with water, then dried. The solution was distilled to dryness.

34 gm. of 3,3-ethylenedioxy-13β-ethyl-4,5-seco-$\Delta^9$-gonene-11β-ol-5,17-dione wree obtained, which product was soluble in the usual organic solvents and insoluble in water.

As far as is known, this compound is not described in the literature.

Step E: 13β - ethyl - 4,5-seco-$\Delta^9$-gonene-11β-ol-3,5,17-trione.—34 gm. of 3,3-ethylenedioxy-13β-ethyl-4,5-seco-$\Delta^9$-gonene-11β-ol-5,17-dione, 27 gm. of cittric acid, and 27 cc. of water were introduced under an atmosphere of nitrogen into 270 cc. of benzene. The mixture was heated to reflux for a period of one hour and thereafter cooled to room temperature. 600 cc. of a saturated aqueous solution of sodium bicarbonate were added thereto and the aqueous phase was decanted. The aqueous phase was extracted with methylene chloride. The organic phases were combined, washed with water until the wash water was neutral, dried, and concentrated to dryness under vacuum. 30 gm. of 13β-ethyl-4,5-seco-$\Delta^9$-gonene-11β-ol-3,5,17-trione were obtained.

Ulttraviolet spectra (ethanol):

$\lambda_{max.}$ at 244 m$\mu$ E$_{1cc.}^{1\%}$ = 285

As far as is known, this compound is not described in the literature.

EXAMPLES OF UTILIZATION OF THE COMPOUNDS OF FORMULA I

Example 5.—$\Delta^4$-estrene-11β,17β-diol-3-one

Step A: 4,5 - seco - estrane-11β,17β-diol-3,5-dione.— A mixture of 522 cc. of ethanol containing 5% of water and 52.2 cc. of triethylamine was introduced into a hydrogenation apparatus. Then 52.2 gm. of 4,5-seco-$\Delta^9$-estrene-11β,17β-diol-3,5-dione (the product obtained in Step D of Example 1), some animal carbon black, and 2.6 cc. of a solution of palladium hydroxide in aqueous hydrochloric acid (the solution analyzing 10 gm. of palladium per 100 cc.) were thereafter introduced under an atmosphere of nitrogen into the hydrogenation apparatus. The apparatus was purged and agitated under an atmosphere of hydrogen until the end of the hydrogen absorption. 3.9 liters of hydrogen were thus absorbed. The catalyst and the carbon black were eliminated by filtration. The filtrate was concentrated to dryness under reduced pressure.

The product obtained (58 gm.) was dissolved at reflux in 580 cc. of ethyl acetate. The solution was cooled and crystallization was initiated by scratching. The mixture was cooled to 0° C. The precipitate formed was isolated by vacuum filtering and drying. 7 gm. (product A) of raw (9β,10α)-4,5-seco-estrane-11β,17β-diol-3,5-dione was thus obtained.

The filtrate was concentrated to dryness under reduced pressure. 50.5 gm. of raw 4,5-seco-estrane-11β,17β-diol-3,5-dione were obtained, which was utilized as such for the next stage.

By crystallization from ethyl acetate, 4,5-seco-estrane-11β,17β-diol-3,5-dione was obtained, having a melting point of 129° C. and a specific rotation $[\alpha]_D^{20}$ = +25° (c. = 0.5% in methanol).

Analysis.—$C_{18}H_{28}O_4$; molecular weight = 308.39. Calculated (percent): C, 70.09; H, 9.15. Found (percent): C, 70.1; H, 8.8.

Circular dichroism (dioxane):
    max. at 290 m$\mu$ ($\Delta\epsilon$ = −3.10)
    inflection towards 297 m$\mu$ M.N.R. spectra (deutero chloroform)—the spectra was composed as follows:

signal at 64.5 mHz. corresponding to hydrogens of the methyl in the 13 position signal at 127 mHz. corresponding to hydrogens of the methyl of the —COCH$_3$ group signal at 219 mHz. corresponding to the hydrogen in the 17 position signal at 256 mHz. corresponding to the hydrogen in the 11 position.

As far as is known, this compound is not described in the literature.

Step B: Δ$^4$-estrene - 11β,17β - diol - 3 - one.—50.5 gm. of raw 4,5-seco-estrane - 11β,17β - diol - 3,5 - dione, obtained in Step A, was introduced under an atmosphere of nitrogen into 1010 cc. of a methanolic solution of potassium hydroxide containing 0.45 gm. of potassium hydroxide per 100 cc. The reaction mixture was heated to reflux and maintained at reflux for a period of 2 hours. Thereafter, the mixture was cooled to 20° C. and acidified to a pH of 5.5 by the addition of acetic acid. Water was added to the reaction mixture, and the methanol was eliminated by distillation under reduced pressure. The precipitate formed was vacuum filtered and dried. Thereafter, the residue was crystallized from ethyl acetate and 26.6 gm. of Δ$^4$ - estrene - 11β,17β - diol - 3 - one were obtained, having a melting point of 220° C. By concentration of the mother liquors from the crystallization step, a second yield of 3.26 gm. was isolated, having a melting point of 219° C.

A sample of the first yield, having a melting point of 220° C., was purified by chromatography through silica gel. The product obtained has the following characteristics: melting point=222° C. [α]$_D^{20}$=+91° (c.=0.5% in methanol).

Analysis.—C$_{18}$H$_{26}$O$_3$; molecular weight=290.40. Calculated (percent): C, 74.44; H, 9.02. Found (percent): C, 74.3; H, 9.0.

Circular dichroism (dioxane):

max. at 342 mμ (Δ$_\epsilon$=—1.13)
max. at 329 mμ (Δ$_\epsilon$=—1.397)
max. at 318 mμ (Δε=—1.107)
max. at 233 mμ (Δ$_\epsilon$=+4.89)

This product is identical to that described in U.S. Pat. No. 2,778,841.

Example 6.—(9β,10α)-Δ$^4$-estrene-11β,17β-diol-3-one

Step A: (9β,10α) - 4,5 - seco-estrane - 11β,17β - diol-3,5-dione.—The product A (7 gm.) obtained in Step A of Example 5, as indicated, was (9β,10α) - 4,5 - seco-estrane-11β,17β-diol-3,5-dione. This product was crystallized from ethanol and 4.2 gm. of (9β,10α) - 4,5 - seco-estrane - 11β,17β - diol - 3,5 - dione were obtained, having a melting point of 193° C. and a specific rotation [α]$_D^{20}$=—20° (c.=0.5% in methanol).

Analysis.—C$_{18}$H$_{28}$O$_4$; molecular weight=308.40. Calculated (percent): C, 70.10; H, 9.15. Found (percent): C, 69.8; H, 9.2.

Circular dichroism (dioxane): max. at 292 mμ (Δ$_\epsilon$=+1.28)

As far as is known, this compound is not described in the literature.

Step B: (9β,10α) - Δ$^4$ - estrene - 11β, 17β - diol - 3-one.—5 gm. of (9β,10α) - 4,5 - seco-estrane - 11β,17β-diol-3,5-dione were introduced under an atmosphere of nitrogen into 100 cc. of a methanolic solution of potassium hydroxide containing 0.45 gm. of potassium hydroxide per 100 cc. The solution was heated to reflux and maintained there for a period of 2 hours. The reaction solution was then cooled to 20° C. and brought to a pH of 5.5 by the addition of acetic acid. Water was then added thereto, and the methanol was eliminated by distillation under reduced pressure. The precipitate formed was vacuum filtered and dried. Thereafter it was dissolved in 40 volumes of ethyl acetate, filtered, and cooled to 0° C. The precipitate formed was isolated by vacuum filtration and dried. 3.82 gm. of (9β,10α)-Δ$^4$-estrene - 11β,17β - diol - 3 - one were obtained, having a melting point of 272° C. and a specific rotation

[α]$_D^{20}$=—75.5°

(c.=0.6% in methanol).

Analysis.—C$_{18}$H$_{26}$O$_3$; molecular weight=290.4. Calculated (percent): C, 74.44; H, 9.03. Found (percent): C,74.4; H, 9.0.

Circular dichroism (dioxane):

max. at 359 mμ (Δ$_\epsilon$=+0.174)
max. at 344 mμ (Δ$_\epsilon$=+0.700)
max. at 330 mμ (Δ$_\epsilon$=+0.97)
max. at 318 mμ (Δ$_\epsilon$=+0.83)
inflection towards 308 mμ
max. at 234 mμ (Δ$_\epsilon$=—9.8)
inflection towards 240 and 225 mμ

This compound can be used in steroid synthesis according to French Patent 1,404,412.

Example 7.—13β-ethyl-Δ$^4$-gonene-11β,17β-diol-3-one

Step A: 13β - ethyl - 4,5 - seco-gonene-11β,17β-diol-3,5-dione.—A mixture of 180 cc. of ethanol and 18 cc. of triethylamine were introduced into a hydrogenation apparatus. Then under an atmosphere of nitrogen, 9 gm. of 13β - ethyl - 4,5 - seco - Δ$^9$ - gonene - 11β,17β - diol-3,5-dione (product obtained in Step D of Example 2), some animal carbon black, and 0.45 cc. of a solution of palladium hydroxide in aqueous hydrochloric acid (solution containing 10 gm. of palladium per 100 cc.) were introduced into the hydrogenation apparatus under an atmosphere of nitrogen. The hydrogenation apparatus was purged, and the contents were agitated under an atmosphere of hydrogen until the end of the absorption of the hydrogen. The agitation was continued under an atmosphere of hydrogen for another hour. The apparatus was opened and the contents removed therefrom. The catalyst and the carbon black were removed from the reaction mixture by filtration. The filtrate was concentrated to dryness under reduced pressure. The residue was crystallized from ethyl acetate and 3.82 gm. of 13β-ethyl - 4,5 - seco-gonane - 11β,17β - diol - 3,5 - dione were obtained, having a melting point of 173° C.

A sample of this product was crystallized from ethyl acetate to give a product having a melting point of 173° C. and a specific rotation [α]$_D^{20}$=+21° (c.=0.5% in methanol).

Analysis.—C$_{19}$H$_{34}$O$_4$; molecular weight=322.43. Calculated (percent): C, 70.77; H, 9.38. Found (percent): C, 70.7; H, 9.4.

Circular dichroism: Δ$_\epsilon$ at 290 mμ=—3.44

As far as is known, this compound is not described in the literature.

Step B: 13β - ethyl-Δ$^4$-gonene-11β,17β-diol-3-one.—3.8 gm. of 13β - ethyl-4,5-seco-gonane-11β,17β-diol-3,5-dione were introduced into 76 cc. of a methanolic solution of potassium hydroxide containing 0.5 gm. of potassium hydroxide per 100 cc., under an atmosphere of nitrogen. The mixture was heated to reflux, and the reflux was maintained for a period of 2 hours. Thereafter, the reaction mixture was cooled and acidified by the addition of a dilute aqueous solution of acetic acid. The methanol was eliminated by distillation under reduced pressure, and the reaction mixture was cooled. The crystals obtained were vacuum filtered, washed and dried. 3.28 gm. of 13β-ethyl-Δ$^4$-gonene-11β,17β-diol-3-one were obtained, having a melting point of 213° C.

A sample of this product was recrystallized from ethyl acetate to give a product having a melting point of 214° C. and a specific rotation [α]$_D^{20}$=+85° (c.=0.5% in methanol).

This compound is described in British Patent No. 1,128,044.

Example 8.—$\Delta^{4,9,11}$-estratriene-17β-ol-3-one

Step A: $\Delta^{4,9}$-estradiene-11β,17β-diol-3-one.—3 gm. of 4,5-seco-$\Delta^9$-estrene-11β,17β-diol-3,5-dione were introduced under an atmosphere of nitrogen into 30 cc. of a methanolic solution of potassium hydroxide containing 0.45 gm. of potassium hydroxide per 100 cc. The reaction mixture was heated to reflux and maintained there for a period of 6 hours. Thereafter, the reaction mixture was cooled to +10° C. and neutralized by the addition of acetic acid. The solvent was eliminated by distillation. Ethyl acetate was added to the reaction mixture, which was then cooled to 0° C. The precipitate formed was vacuum filtered, dried and recrystallized from isopropyl ether. 2.05 gm. of $\Delta^{4,9}$-estradiene-11β,17β-diol-3-one were obtained, having a melting point of 180° C., then 192° C. and a specific rotation $[\alpha]_D^{20} = +44.5°$ (c.=0.5% in dimethylformamide).

Ultraviolet spectra (ethanol): λ max. at 298 mμ (ε=19,730)

This compound is identical to that described in U.S. Patent No. 3,282,785.

Step B: $\Delta^{4,9,11}$-estratriene-17β-diol-3-one were introduced in an atmosphere of nitrogen into 60 cc. of methylene chloride. The mixture was cooled to —5° C. and 15 cc. of a 66° Bé. aqueous solution of sulfuric acid, then 30 cc. of ethyl ether were introduced into the solution. The reaction mixture was agitated vigorously for 5 minutes (starting from the moment of the introduction of the sulfuric acid) while cooling in order to bring the temperature to and maintaining the same at 0° C. The reaction mixture was then poured into a mixture of water and ice. The organic phase was separated by decantation. The aqueous phase was extracted with methylene chloride. The methylene chloride extracts and the principal organic phase were combined. The organic solution obtained was washed by an aqueous solution of sodium bicarbonate and then with water, dried and concentrated to dryness. The residue was dissolved in methylene chloride. The methylene chloride solution was passed through a column of magnesium silicate and eluted with methylene chloride. The eluate was concentrated to a small volume. The residue was crystallized from isopropyl ether. 1.73 gm. of $\Delta^{4,9,11}$-estratriene-17β-ol-3-one was obtained, having a melting point of 182° C.

Ultraviolet spectra (ethanol):

λ max. at 238 mμ (ε=5,920)
inflection towards 270 mμ (ε=3,975)
λ max. at 342 mμ (ε=26,175)

This compound is identical to the $\Delta^{4,9,11}$-estratriene-17β-ol-3-one obtained by another method according to U.S. Patent No. 3,248,294.

Example 9.—13β-ethyl-$\Delta^{4,9,11}$-gonatriene-17β-ol-3-one

Step A: 13β-ethyl-$\Delta^{4,9}$-gonadiene-11β,17β-diol-3-one.— 3 gm. of 13β-ethyl-4,5-seco-$\Delta^9$-gonene-11β,17β-diol-3,5-dione were introduced under an atmosphere of nitrogen into 30 cc. of a methanolic solution of potassium hydroxide containing 0.46 gm. of potassium hydroxide per 100 cc. The reaction mixture was heated to reflux and maintained at reflux for a period of 6 hours. Thereafter, the reaction mixture was cooled to 20° C. and the pH was brought to between 5 and 6 by the addition of a methanolic solution of acetic acid. Then the mixture was concentrated to dryness under reduced pressure. The residue was purified by a crystallization from ethyl acetate. 2.28 gm. of 13β-ethyl-$\Delta^{4,9}$-gonadiene-11β,17β-diol-3-one were obtained, having a melting point of 193° C. and a specific rotation $[\alpha]_D^{20} = +4.5°$ (c.=0.5% in methanol).

Analysis.—$C_{19}H_{26}O_3$; molecular weight=302.40. Calculated (percent): C, 75.46; H, 8.67. Found (percent): C, 75.2; H, 8.9.

Ultraviolet spectra (ethanol): λ max. at 297–298 mμ (ε=20,000)

On concentration to a small volume of the mother liquors from the crystallization step, a second yield of 0.150 gm. was obtained, having a melting point of 189° C.

As far as known, 13β-ethyl-$\Delta^{4,9}$-gonadiene-11β,17β-diol-3-one is not described in the literature.

Step B: 13β-ethyl-$\Delta^{4,9,11}$-gonatriene-17β-ol-3-one.— 3 gm. of 13β-ethyl-$\Delta^{4,9}$-gonadiene-11β,17β-diol-3-one were introduced, under an atmosphere of nitrogen and while agitating in order to homogenize the mixture and while maintaining the temperature of the reaction mixture at +15° C., into a mixture of 7.5 cc. of methylene chloride and 22.5 cc. of an aqueous 66° Bé. solution of sulfuric acid. At the end of 6 minutes, the reaction mixture was poured on ice. The methylene chloride phase was separated by decantation. The aqueous phase was extracted with methylene chloride. The methylene chloride extracts and the principal organic phase were combined. The solution obtained was washed with an aqueous solution of sodium bicarbonate and then with water. Thereafter, the organic phase was dried, then concentrated to dryness under reduced pressure. The residue was crystallized from isopropyl ether. 1.82 gm. of 13β-ethyl-$\Delta^{4,9,11}$-gonatriene-17β-ol-3-one were obtained, having a melting point of 155° to 160° C. (Köfler).

Ultraviolet spectra (ethanol):
λ max. at 238 mμ (ε=5,650)
λ max. at 269–270 mμ (ε=3,635)
λ max. at 343 mμ (ε=26,400)

This compound is identical to 13β-ethyl-$\Delta^{4,9,11}$-gonatriene-17β-ol-3-one obtained by another method according to Belgian Patent No. 679,368.

In an analogous fashion, 13β-R-$\Delta^{4,9,11}$-gonatriene-17β-ol-3-ones having 13β-propyl or 13β-butyl groups, either straight chain or branched chain, were obtained.

Example 10.—$\Delta^{4,9}$-estradiene-11β-ol-3,17-dione 2.3 gm. of 4,5-seco-$\Delta^9$-estrene-11β-ol-3,5,17-trione were introduced into 23 cc. of a methanolic potassium hydroxide solution (4 gm. per liter). The reaction mixture was heated to reflux under agitation and under an atmosphere of nitrogen for a period of 6 hours. Thereafter, the reaction mixture was cooled to room temperature and 1 cc. of a 10% acetic acid solution in methanol was added thereto. The reaction mixture was distilled to dryness under vacuum. The residue was dissolved in 10 cc. of benzene and subjected to chromatography through magnesium silicate with elution with benzene. After recrystallization from ether, 0.2 gm. of $\Delta^{4,9}$-estradiene-11β-ol-3,17-dione were obtained, having a melting point of 179° C. and a specific rotation $[\alpha]_D^{20} = +84°$ (c.=0.5% in chloroform).

This product is identical to that described in U.S. Patent No. 3,282,785.

Example 11.—13β-ethyl-$\Delta^{4,9}$-gonadiene-11β-ol-3,17-dione 30 gm. of 13β-ethyl-4,5-seco-$\Delta^9$-gonene-11β-ol-3,5,17-trione were introduced into 270 cc. of a methanolic potassium hydroxide solution (4.9 gm. per liter). The reaction mixture was heated to reflux under agitation and an atmosphere of nitrogen for a period of one hour. Thereafter, the reaction mixture was cooled to 20° C. and brought to a pH of between 5 and 6 by the addition of acetic acid. Then, the reaction mixture was diluted with 500 cc. of water. The aqueous phase was extracted with methylene chloride. The combined organic phases were washed with water, dried, and treated with animal carbon black. The organic phase was then filtered under vacuum, washed with methylene chloride, then distilled to dryness under vacuum. The residue was treated with isopropyl ether and with ether, then dissolved in 120 cc. of ethyl acetate, to which 100 cc. of isopropyl ether was slowly added. The mixture was agitated for one hour at 20° C. and filtered under vacuum. The residue was triturated with isopropyl ether and dried under vacuum. 5.6 gm. of 13β-ethyl-$\Delta^{4,9}$-gonadiene-11β-ol-3,17-dione were obtained, having a melting point of 158° C. and a specific rotation $[\alpha]_D^{20} = +44.2°$ (c.=0.5% in chloroform).

This product is identical to that described in French Patent No. 1,514,088.

The preceding specific embodiments are illustrative of the practice of the invention. It is to be understood, however, that other expedients known to those skilled in the art, may be employed without departing from the spirit of the invention.

We claim:
1. 13β-R-4,5-seco-Δ⁹-gonene-3,5-diones of the formula

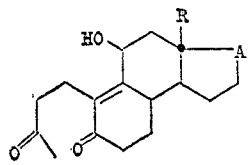

wherein R represents an alkyl having 1 to 4 carbon atoms and A represents a member selected from the group consisting of

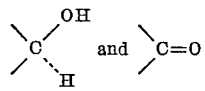

2. The compound of claim 1 wherein R is methyl and A is

3. The compound of claim 1 wherein R is ethyl and A is

4. The compound of claim 1 wherein R is methyl and A is >C=O.
5. The compound of claim 1 wherein R is ethyl and A is >C=O.
6. The process for the preparation of the 13β-R-4,5-seco-Δ⁹-gonene-3,5-diones of claim 1, which comprises the steps of (a) causing the double bond to migrate from the 9,10 position to the 9,11 position of a 3-ketal of a 13β-R-4,5-seco-Δ⁹-gonene-3,5-dione of the formula

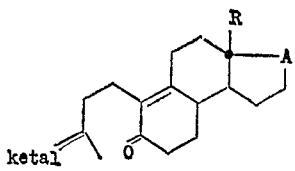

wherein R represents an alkyl having 1 to 4 carbon atoms and A represents a member selected from the group consisting of

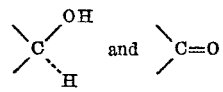

by the action of a basic isomerization agent selected from the group consisting of an alkali metal tertiary-lower-alkanolate, an alkali metal amide and an alkali metal acetylide, followed by the action of an acid agent selected from the group consisting of lower alkanoic acids and boric acid in an aqueous solution, (b) oxidizing the resultant 3-ketal of a 13β-R-4,5-seco-Δ⁹,⁽¹¹⁾-gonene-3,5-dione of the formula

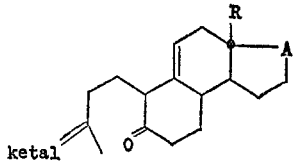

wherein R and A have the above-assigned meanings, by the action of a gas containing oxygen, in a basic media selected from the group consisting of tri-lower-alkyl-amines, tertiary cyclic amines and organic quaternary ammonium compounds, (c) subjecting the resultant 3-ketal of an 11β-hydroperoxy-13β-R-4,5-seco-Δ⁹-gonene-3,5-dione of the formula

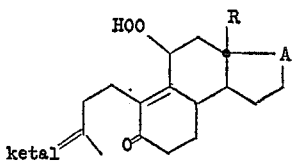

wherein R and A have the above-assigned meanings, to the action of a reducing agent selected from the group consisting of tri-lower alkyl phosphites and alkali metal iodides in the presence of lower alkanoic acids, (d) hydrolyzing the resultant 3-ketal of an 11β-hydroxy-13β-R-4,5-seco-Δ⁹-gonene-3,5-dione of the formula

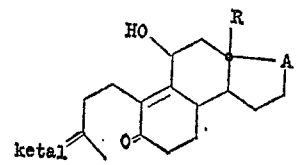

wherein R and A have the above-assigned meanings, by the action of a hydrolyzing acid selected from the group consisting of lower alkanoic acids and hydroxy-lower alkanoic acids and the hydrolyzing step is conducted in the presence of an organic solvent media selected from the group consisting of lower alkanols, aromatic hydrocarbons and mixtures thereof, and (c) recovering said 13β-R-4,5-seco-Δ⁹-gonene-3,5-diones.

7. The process of claim 6, step (a), wherein said isomerization step is effected in an organic solvent.
8. The process of claim 7 wherein said organic solvent is selected from the group consisting of dimethylsulfoxide, dimethylformamide and the dimethyl ether of diethylene glycol.
9. The process of claim 6, step (b), wherein said oxidization in a basic media is effected in the presence of a solvent selected from the group consisting of lower alkanols, N,N-di-lower alkyl lower-alkanoyl amides and mixtures of the two.
10. The process of claim 6 wherein said 3-ketal is a 3,3-ethylenedioxy ketal.

References Cited
UNITED STATES PATENTS

| | | | |
|---|---|---|---|
| 3,205,226 | 9/1965 | Barton | 260—239.55 |
| 3,211,764 | 10/1965 | Brown, et al. | 260—397.45 |
| 3,301,756 | 1/1967 | Joly, et al. | 260—397.45 |

ALEX MAZEL, Primary Examiner

J. H. TURNIPSEED, Assistant Examiner

U.S. Cl. X.R.

260—340.9, 397.3, 397.4; 424—242, 243, 331